(12) United States Patent
Hashimoto

(10) Patent No.: US 6,901,749 B2
(45) Date of Patent: Jun. 7, 2005

(54) EXHAUST EMISSION CONTROL SYSTEM FOR INTERNAL COMBUSTION ENGINE

(75) Inventor: Akira Hashimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 724 days.

(21) Appl. No.: 09/915,293

(22) Filed: Jul. 27, 2001

(65) Prior Publication Data

US 2002/0015669 A1 Feb. 7, 2002

(30) Foreign Application Priority Data

Aug. 1, 2000 (JP) ...................................... 2000-232889

(51) Int. Cl.$^7$ ................................................. F01N 3/00
(52) U.S. Cl. ............................. 60/295; 60/285; 60/297
(58) Field of Search ........................ 60/274, 278, 285, 60/295, 297

(56) References Cited

U.S. PATENT DOCUMENTS

| | | | | |
|---|---|---|---|---|
| 5,832,722 A | * | 11/1998 | Cullen et al. ................... | 60/274 |
| 6,263,666 B1 | * | 7/2001 | Kubo et al. ..................... | 60/277 |
| 6,272,848 B1 | * | 8/2001 | Okude et al. ................... | 60/274 |
| 6,341,487 B1 | * | 1/2002 | Takahashi et al. ............. | 60/286 |
| 6,620,392 B2 | * | 9/2003 | Okamoto et al. ............. | 423/213.5 |
| 6,644,021 B2 | * | 11/2003 | Okada et al. ................... | 60/286 |
| 6,679,050 B1 | * | 1/2004 | Takahashi et al. ............. | 60/285 |

FOREIGN PATENT DOCUMENTS

| | | |
|---|---|---|
| DE | 195 22 165 A1 | 12/1995 |
| DE | 197 44 579 A1 | 4/1998 |
| DE | 197 44 738 A1 | 4/1998 |
| DE | 197 05 335 C1 | 9/1998 |
| DE | 694 20 488 T2 | 4/2000 |
| JP | 11-247650 | 9/1999 |

* cited by examiner

*Primary Examiner*—Binh Q. Tran
(74) *Attorney, Agent, or Firm*—Arent Fox PLLC

(57) ABSTRACT

An exhaust emission control system for an internal combustion engine, having a nitrogen oxide removing device provided in an exhaust system of said engine for absorbing nitrogen oxide contained in exhaust gases in an exhaust lean condition. An amount of change per unit time in the sulfur oxide amount absorbed in the nitrogen oxide removing device is estimated according to the air-fuel ratio of an air-fuel mixture supplied to said engine and the operating condition of said engine. The estimated amount of change is accumulated to thereby estimate the sulfur oxide amount absorbed in the nitrogen oxide removing device. The sulfur oxide is removed from the nitrogen oxide removing device when the estimated sulfur oxide amount has reached a set value.

15 Claims, 9 Drawing Sheets

EXHAUST EMISSION CONTROL SYSTEM FOR INTERNAL COMBUSTION ENGINE

BACKGROUND OF THE INVENTION

The present invention relates to an exhaust emission control system for an internal combustion engine having a nitrogen oxide (NOx) removing device in an exhaust system, and more particularly to an exhaust emission control system capable of performing a regeneration process for the NOx removing device in the case that it is deteriorated by sulfur poisoning.

A conventional exhaust emission control system known in the art includes a NOx removing device in an exhaust system of an internal combustion engine. In this exhaust emission control system, NOx is absorbed by the NOx removing device in a lean operation where the air-fuel ratio is set in a lean region with respect to a stoichiometric ratio, and NOx absorbed by the NOx removing device is reduced to be discharged by suitably executing enrichment of the air-fuel ratio. The NOx absorption capacity of the NOx removing device decreases from sulphur poisoning because it also absorbs oxides of sulfur contained in the fuel. To cope with this problem, there has been proposed an exhaust emission control system having a SOx catalyst capable of absorbing sulfur oxide (SOx) provided upstream of the NOx removing device (e.g., Japanese Patent Laid-open No. 11-247650).

In the exhaust emission control system described in this publication, the amount of sulfur oxide absorbed by the SOx catalyst is estimated, and when the estimated amount of sulfur oxide reaches a set value, a regeneration process for removing the absorbed sulfur oxide is executed. To estimate the amount of absorbed sulfur oxide, a counter is provided and an addition value per unit time of the counter is set according to a rotational speed and an intake pressure of the engine. By incrementing the counter with the addition value, the amount of sulfur oxide absorbed by the SOx catalyst is estimated.

In the case that no SOx catalyst is provided in the exhaust system, sulfur oxide is absorbed in the NOx removing device. Accordingly, it is necessary to execute the regeneration process such that the air-fuel ratio is enriched in the condition where the temperature of the NOx removing device is high, thereby discharging the absorbed sulfur oxide. In this case, the amount of sulfur oxide absorbed in the NOx removing device must first be estimated. However, if the technique described in the above publication is applied, the following problem arises.

Although frequently executing the lean operation where the air-fuel ratio of an air-fuel mixture to be supplied to the engine is set in a lean region with respect to the stoichiometric ratio, there is also a period of performing a stoichiometric operation where the air-fuel ratio is set to the stoichiometric ratio, or a rich operation where the air-fuel ratio is set in a rich region with respect to the stoichiometric ratio. When the temperature of the NOx removing device becomes high during the stoichiometric operation or the rich operation, the sulfur oxide absorbed in the NOx removing device are discharged. However, such discharge of the sulfur oxide during the stoichiometric operation or the rich operation is not considered in the conventional system described in the above publication, so that the estimation of the amount of sulfur oxide absorbed in the NOx removing device becomes inaccurate. This causes a problem in that the timing of execution of the regeneration process may deviate from the optimum timing.

SUMMARY OF THE INVENTION

Accordingly, the present invention provides an exhaust emission control system that can accurately estimate the amount of sulfur oxide absorbed in the NOx removing device to thereby execute the regeneration process for the sulfur-poisoned NOx removing device at the optimum timing.

In accordance with the present invention, there is provided an exhaust emission control system for an internal combustion engine, comprising a nitrogen oxide removing device, a sulfur oxide amount estimating module, and a sulfur oxide removing module. The nitrogen oxide removing device is provided in an exhaust system of the internal combustion engine for absorbing nitrogen oxide contained in exhaust gases in an exhaust lean condition. The sulfur oxide amount estimating module estimates the amount of sulfur oxide absorbed in the nitrogen oxide removing device. The sulfur oxide removing module removes the sulfur oxide when the amount of the sulfur oxide estimated by the sulfur oxide amount estimating module has reached a set value. More specifically, the sulfur oxide amount estimating module estimates an amount of change per unit time in the sulfur oxide amount according to the air-fuel ratio of an air-fuel mixture supplied to the engine and the operating condition of the engine, and accumulates the estimated amount of change to thereby estimate the sulfur oxide amount.

With this configuration, the amount of change (i.e., absorption amount or discharge amount) per unit time in the amount of sulfur oxide absorbed in the nitrogen oxide removing device is estimated according to the air-fuel ratio of an air-fuel mixture supplied to the engine and the operating condition of the engine, and the amount of change estimated above is accumulated to thereby estimate the amount of sulfur oxide absorbed in the nitrogen oxide removing device. Accordingly, the estimation of the amount of sulfur oxide can be made more accurately as compared with the prior art, and the regeneration process for the sulfur-poisoned nitrogen oxide removing device can be executed at an optimum timing.

Preferably, the sulfur oxide amount estimating module includes a first estimating module for estimating the amount of change in the sulfur oxide amount according to the operating condition of the engine when the air-fuel ratio is set in the vicinity of the stoichiometric ratio, a second estimating module for estimating the amount of change in the sulfur oxide amount according to the operating condition of the engine when the air-fuel ratio is set in a lean region with respect to the stoichiometric ratio, and a third estimating module for estimating the amount of change in the sulfur oxide amount according to the operating condition of the engine when the air-fuel ratio is set in a rich region with respect to the stoichiometric ratio.

The amount of sulfur oxide absorbed in the nitrogen oxide removing device increases when the air-fuel ratio is set in a lean region with respect to the stoichiometric ratio. When the air-fuel ratio is set in the vicinity of the stoichiometric ratio or in a rich region with respect to the stoichiometric ratio, the amount of sulfur oxide absorbed in the nitrogen oxide removing device increases or decreases according to the engine operating condition. Accordingly, the first, second, and third estimating means are used to estimate the amount of change in the sulfur oxide amount when the air-fuel ratio is set in the vicinity of the stoichiometric ratio, the amount of change when the air-fuel ratio is set in the lean region, and the amount of change when the air-fuel ratio is set in the rich region according to the engine operating condition, thereby accurately estimating the amount of change in the sulfur oxide amount (i.e., the absorption amount or the discharge amount) per unit time.

Preferably, the first estimating module outputs a first negative amount of change (SDESST) in the sulfur oxide amount in an engine operating condition where the temperature of the nitrogen oxide removing device is higher than or equal to a first predetermined temperature (e.g., 700 deg C.), and outputs a first positive amount of change (SABSST) in the sulfur oxide amount in an engine operating condition where the temperature of the nitrogen oxide removing device is lower than the first predetermined temperature. The second estimating module outputs a second positive amount of change (SABSL) in the sulfur oxide amount according to the operating condition of the engine. The third estimating module outputs a second negative amount of change (SDESR) in the sulfur oxide amount in an engine operating condition where the temperature of the nitrogen oxide removing device is higher than or equal to a second predetermined temperature (e.g., 600 deg C.) which is lower than the first predetermined temperature, and outputs a third positive amount of change (SABSR) in the sulfur oxide amount in an engine operating condition where the temperature of the nitrogen oxide removing device is lower than the second predetermined temperature.

Preferably, the first estimating module calculates the first negative amount of change so that the absolute value of the first negative amount of change increases with an increase in the rotational speed and/or the intake pressure of the engine, and calculates the first positive amount of change so that the first positive amount of change decreases with an increase in the rotational speed and/or the intake pressure of the engine. The second estimating module calculates the second positive amount of change so that the second positive amount of change increases with an increase in the rotational speed and/or the intake pressure of the engine. The third estimating module calculates the second negative amount of change so that the absolute value of the second negative amount of change increases with an increase in the rotational speed and/or the intake pressure of the engine, and calculates the third positive amount of change so that the third positive amount of change decreases with an increase in the rotational speed and/or the intake pressure of the engine.

Preferably, the sulfur oxide removing module sets the air-fuel ratio in the vicinity of the stoichiometric ratio over a predetermined time period and subsequently sets the air-fuel ratio to a rich air-furl ratio with respect to the stoichiometric ratio when removing the sulfur oxide.

Preferably, the sulfur oxide removing module retards the ignition timing of the engine from a normal set value, stops the exhaust gas recirculation, and controls the amount of intake air supplied to the engine so that the output torque of the engine does not change when removing the sulfur oxide.

DETAILED DESCRIPTION OF THE PREFERRED EMBODIMENTS

A preferred embodiment of the present invention will now be described with reference to the drawings.

Figure 1:
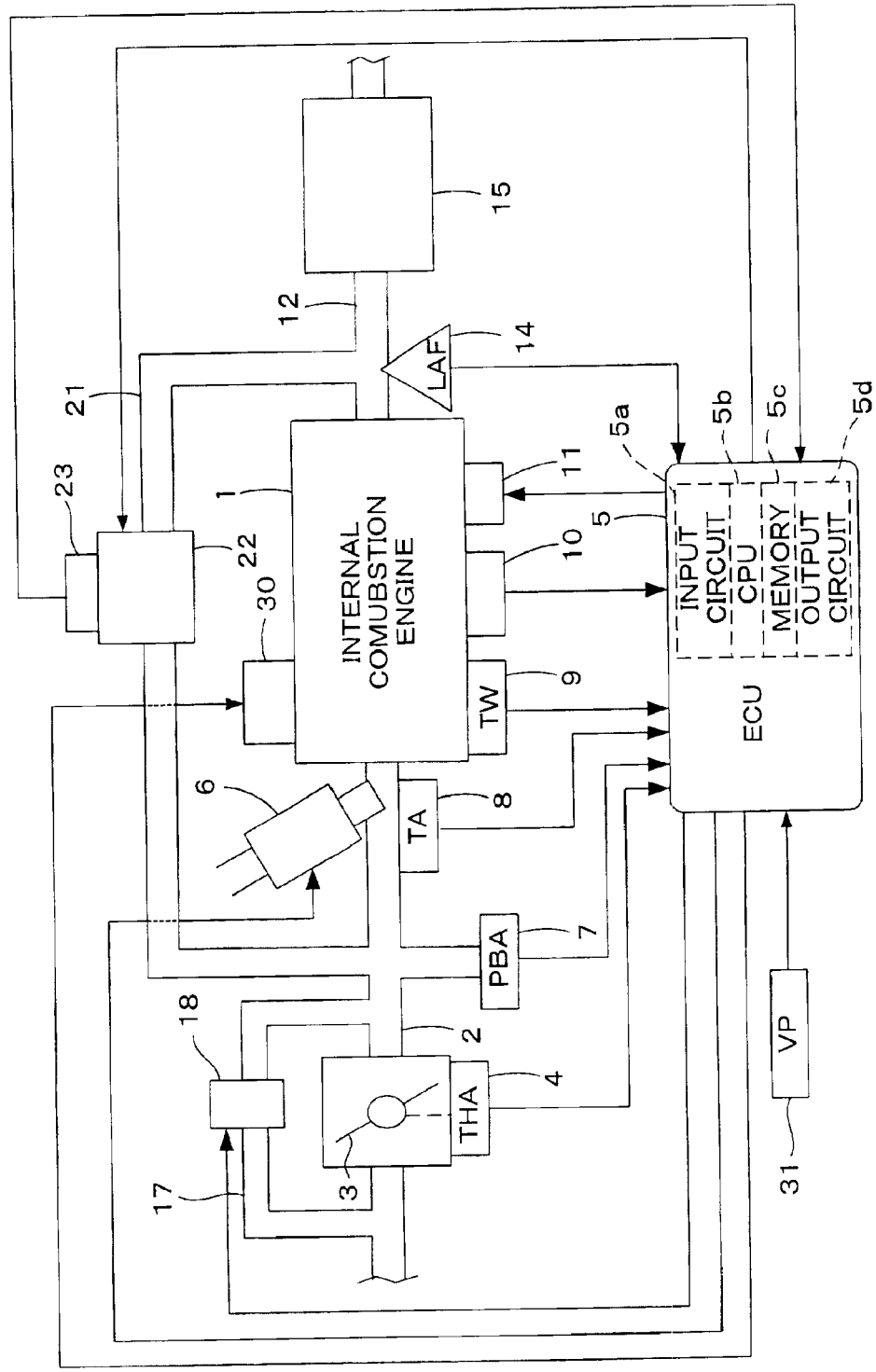
FIG. 1 is a schematic diagram showing the configuration of an internal combustion engine and an exhaust emission control system therefor according to a preferred embodiment of the present invention.

Referring to FIG. 1, there is schematically shown a general configuration of an internal combustion engine (which will be hereinafter referred to as "engine") and a control system therefor, including an exhaust emission control system according to a preferred embodiment of the present invention. The engine is a four-cylinder engine 1, for example, and has an intake pipe 2 provided with a throttle valve 3. A throttle valve opening (THA) sensor 4 is connected to the throttle valve 3, so as to output an electrical signal corresponding to an opening angle of the throttle valve 3 and to supply the electrical signal to an electronic control unit (which will be hereinafter referred to as "ECU") 5 for controlling the engine 1.

An auxiliary air passage 17 bypasses the throttle valve 3 and is connected to the intake pipe 2. The auxiliary air passage 17 is provided with an auxiliary air control valve 18 for controlling an auxiliary air amount. The auxiliary air control valve 18 is connected to the ECU 5, and its valve opening amount is controlled by the ECU 5.

Fuel injection valves 6, only one of which is shown, are inserted into the intake pipe 2 at locations intermediate between the cylinder block of the engine 1 and the throttle valve 3 and slightly upstream of the respective intake valves (not shown). The fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 8 is provided immediately downstream of the throttle valve 3. An absolute pressure signal converted to an electrical signal by the absolute intake pressure sensor 8 is supplied to the ECU 5. An intake air temperature (TA) sensor 9 is provided downstream of the absolute intake pressure sensor 8 to detect an intake air temperature TA. An electrical signal corresponding to the detected intake air temperature TA is output from the sensor 9 and supplied to the ECU 5.

An engine coolant temperature (TW) sensor 10 such as a thermistor is mounted on the body of the engine 1 to detect an engine coolant temperature (cooling water temperature) TW. A temperature signal corresponding to the detected engine coolant temperature TW is output from the sensor 10 and supplied to the ECU 5.

A crank angle position sensor 10 for detecting a rotational angle of a crankshaft (not shown) of the engine 1 is connected to the ECU 5, and a signal corresponding to the detected rotational angle of the crankshaft is supplied to the ECU 5. The crank angle position sensor 10 consists of a cylinder discrimination sensor for outputting a signal pulse at a predetermined crank angle position for a specific cylinder of the engine 1 (this signal pulse will be hereinafter referred to as "CYL signal pulse"). The crank angle position sensor 10 also consists of a TDC sensor for outputting a TDC signal pulse at a crank angle position before a top dead center (TDC) of a predetermined crank angle starting at an intake stroke in each cylinder (at every 180 deg crank angle in the case of a four-cylinder engine), and a CRK sensor for generating one pulse with a constant crank angle period (e.g., a period of 30 deg) shorter than the period of generation of the TDC signal pulse (this pulse will be hereinafter referred to as "CRK signal pulse"). The CYL signal pulse, the TDC signal pulse, and the CRK signal pulse are supplied to the ECU 5. These signal pulses are used to control the various timings, such as fuel injection timing and ignition timing, and for detection of an engine rotational speed NE.

An exhaust pipe 12 of the engine 1 is provided with a NOx removing device 15. The NOx removing device 15 absorbs NOx in the exhaust lean condition where the air-fuel ratio of the air-fuel mixture to be supplied to the engine 1 is set in a lean region with respect to the stoichiometric ratio. The NOx removing device 15 discharges the absorbed NOx in the exhaust rich condition where the air-fuel ratio of the air-fuel mixture supplied to engine 1 is in the vicinity of the stoichiometric ratio or in a rich region with respect to the stoichiometric ratio, thereby reducing the discharged NOx into nitrogen gas by HC and CO and oxidizing the HC and CO into water vapor and carbon dioxide.

When the amount of NOx absorbed by the NOx absorbent reaches the limit of its NOx absorbing capacity, i.e., the maximum NOx absorbing amount, the NOx absorbent cannot absorb any more NOx. Accordingly, to discharge the absorbed NOx and reduce it, the air-fuel ratio is enriched, that is, reduction enrichment of the air-fuel ratio is performed.

Further, when sulfur oxide (which will be hereinafter referred to as "SOx") are absorbed in the NOx absorbent and the amount of absorbed SOx reaches a set value, a regeneration process for removing SOx is executed. In this preferred embodiment, the NOx absorbent of a NOx adsorbing type is used. Accordingly, the "absorption" of SOx to the NOx absorbent will be hereinafter referred to also as "adsorption", and the "discharge" of SOx from the NOx absorbent will be hereinafter referred to also as "desorption".

A proportional type air-fuel ratio sensor (which will be hereinafter referred to as "LAF sensor") 14 is mounted on the exhaust pipe 12 at a position upstream of the NOx removing device 15. The LAF sensor 14 outputs an electrical signal substantially proportional to the oxygen concentration (air-fuel ratio) in the exhaust gases, and supplies the electrical signal to the ECU 5.

A spark plug 11 is provided in each cylinder of the engine 1. Each spark plug 11 is connected to the ECU 5, and a drive signal for each spark plug 11, i.e., an ignition signal is supplied from the ECU 5.

An exhaust gas recirculation passage 21 is connected between a portion of the intake pipe 2 downstream of the throttle valve 3 and a portion of the exhaust pipe 12 upstream of the NOx removing device 15. The exhaust gas recirculation passage 21 is provided with an exhaust gas recirculation valve (which will be hereinafter referred to as "EGR valve") 22 for controlling an exhaust gas recirculation amount. The EGR valve 22 is an electromagnetic valve having a solenoid, and its valve opening degree is controlled by the ECU 5. The EGR valve 22 is provided with a lift sensor 23 for detecting the valve opening degree (valve lift) LACT of the EGR valve 22 and for supplying a detection signal to the ECU 5. The exhaust gas recirculation passage 21 and the EGR valve 22 constitute an exhaust gas recirculation mechanism.

The engine 1 has a valve timing switching mechanism 30 capable of switching the valve timing of intake valves and exhaust valves between a high-speed valve timing suitable for a high-speed operating region of the engine 1 and a low-speed valve timing suitable for a low-speed operating region of the engine 1. Switching the valve timing also includes switching of a valve lift amount. Further, when selecting the low-speed valve timing, one of the two intake valves in each cylinder is stopped to ensure stable combustion even in the case of setting the air-fuel ratio lean with respect to the stoichiometric ratio.

The valve timing switching mechanism 30 is of a type that the switching of the valve timing is carried out hydraulically. That is, a solenoid valve for performing the hydraulic switching and an oil pressure sensor are connected to the ECU 5. A detection signal from the oil pressure sensor is supplied to the ECU 5, and the ECU 5 controls the solenoid valve to perform the switching control of the valve timing according to an operating condition of the engine 1.

A vehicle speed sensor 31 for detecting a running speed (vehicle speed) VP of a vehicle driven by the engine 1 is connected to the ECU 5, and a detection signal from the vehicle speed sensor 31 is supplied to the ECU 5.

The ECU 5 includes an input circuit 5a having various functions including a function of shaping the waveforms of input signals from the various sensors, a function of correcting the voltage levels of the input signals to a predetermined level, and a function of converting analog signal values into digital signal values, a central processing unit (which will be hereinafter referred to as "CPU") 5b, a memory set 5c consisting of a ROM (read only memory) preliminarily storing various operational programs to be executed by the CPU 5b and a RAM (random access memory) for storing the results of computation or the like by the CPU 5b, and an output circuit 5d for supplying drive signals to the fuel injection valves 6.

The ECU 5 determines engine operating conditions according to various engine parameter signals, and sets a valve lift command value LCMD for the EGR valve 22 according to the engine rotational speed NE and the absolute intake pressure PBA. The ECU 5 supplies a control signal to the solenoid of the EGR valve 22 so that a difference between the valve lift command value LCMD and an actual valve lift amount LACT detected by the lift sensor 23 becomes zero.

The CPU 5b determines various engine operating conditions according to various engine parameter signals as mentioned above, and computes a fuel injection period TOUT of each fuel injection valve 6 to be opened in synchronism with the TDC signal pulse, in accordance with Eq. (1) according to the above determined engine operating conditions.

$$TOUT = TIM \times KCMD \times KLAF \times K1 + K2 \qquad (1)$$

TIM is a basic fuel amount, more specifically, a basic fuel injection period of each fuel injection valve 6, and it is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA. That is, the basic fuel amount TIM has a value substantially proportional to an intake air amount (mass flow) per unit time by the engine.

KCMD is a target air-fuel ratio coefficient, which is set according to engine operational parameters such as the engine rotational speed NE, the throttle valve opening THA, and the engine coolant temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio. Therefore, KCMD is referred to also as a target equivalent ratio. Further, in the case of executing reduction enrichment or enrichment for removing SOx (which will be hereinafter referred to as "SOx removal enrichment") described below, the target air-fuel ratio coefficient KCMD is set to a value greater than 1.0.

KLAF is an air-fuel ratio correction coefficient calculated by PID (Proportional, Integral, Differential) control so that a detected equivalent ratio KACT calculated from a detected value from the LAF sensor 14 becomes equal to the target equivalent ratio KCMD when the condition for executing the feedback control is satisfied.

K1 is another correction coefficient and K2 is a correction variable. The correction coefficient K1 and correction variable K2 are computed according to various engine parameter signals and their values are determined so as to optimize various characteristics such as fuel consumption characteristics and engine acceleration characteristics according to engine operating conditions.

The CPU 5b outputs a drive signal for opening each fuel injection valve 6, an ignition signal for driving each spark plug 11, a drive signal for the auxiliary air control valve 18, and a drive signal for the EGR valve 22 according to the fuel injection period TOUT obtained above through the output circuit 5d.

Figure 2:
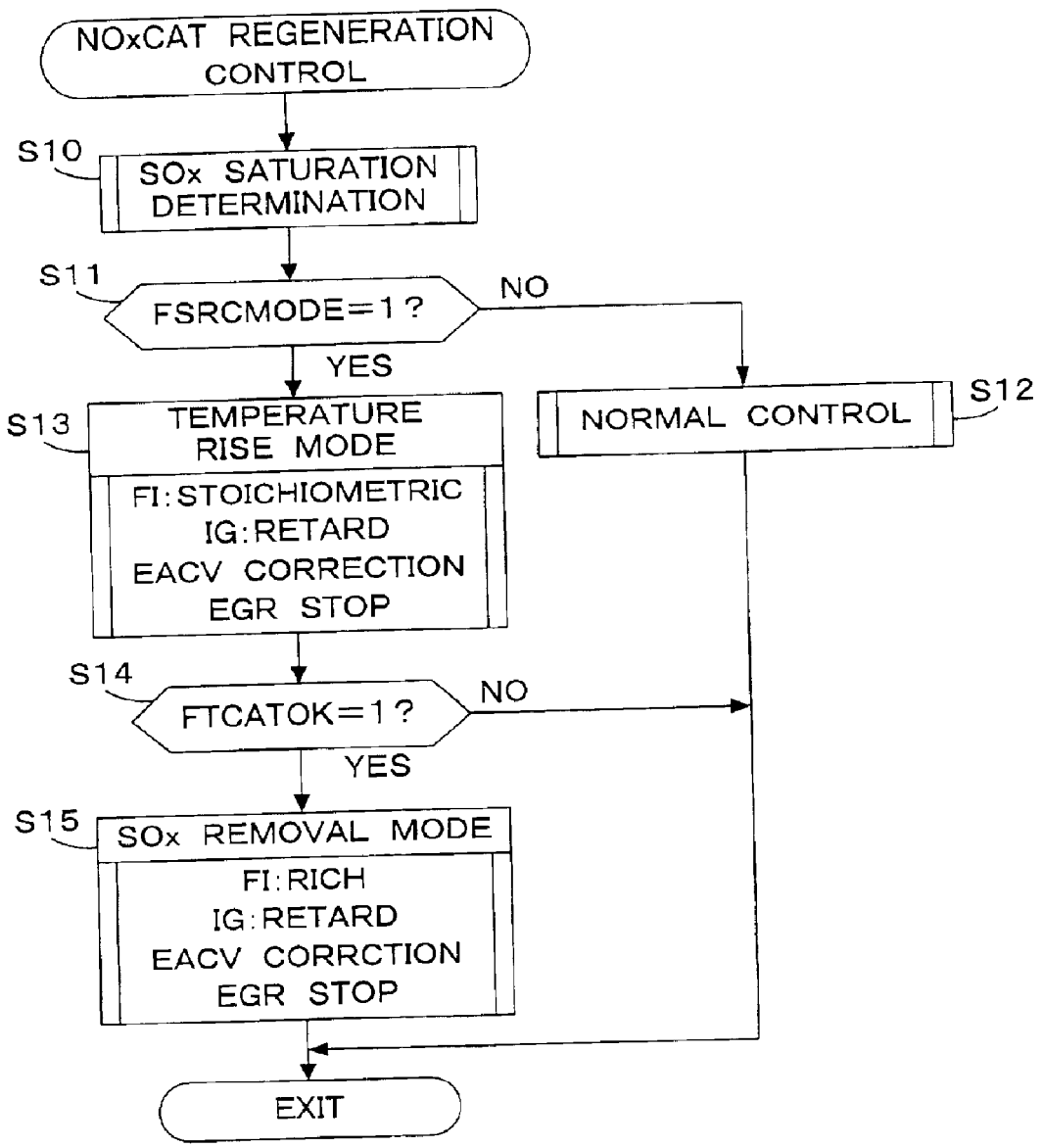
FIG. 2 is a flowchart showing a program for regeneration control of a NOx removing device sulfur-poisoned.

FIG. 2 is a flowchart showing a program for executing the regeneration control of the NOx removing device 15 when the amount of SOx (which amount will be hereinafter referred to as "SOx adsorption amount") adsorbed by the NOx absorbent in the NOx removing device 15. This program is executed by the CPU 5b in synchronism with the generation of a TDC signal pulse.

Figure 3:
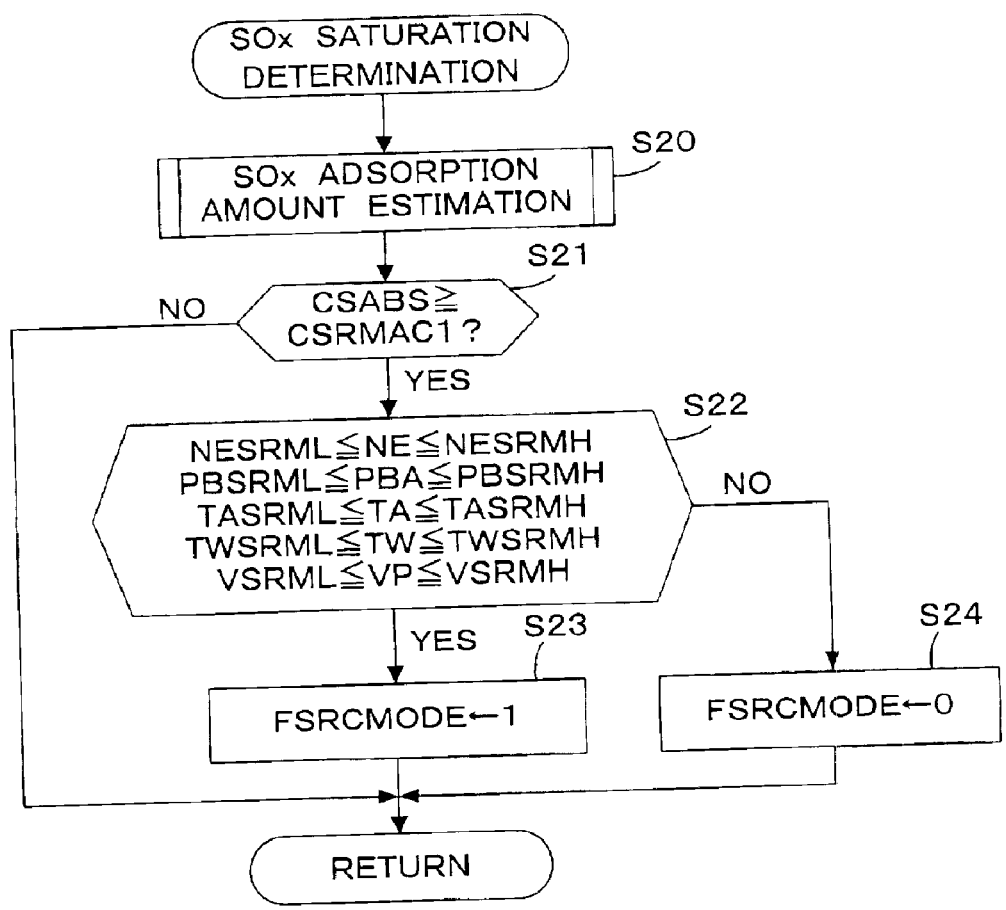
FIG. 3 is a flowchart showing a program for the SOx saturation determination shown in FIG. 2.

In step S10, a SOx saturation determination processing shown in FIG. 3 is executed. In this process, the SOx adsorption amount is calculated according to a set air-fuel ratio (target air-fuel ratio coefficient KCMD) and an operating condition of the engine 1. When the SOx adsorption amount has reached a set value and the engine 1 is operating in a condition suitable for execution of the regeneration process, a regeneration mode flag FSRCMODE is set to "1".

In step S11, it is determined whether or not the regeneration mode flag FSRCMODE is "1". If FSRCMODE is "0", which indicates that the SOx adsorption amount has not reached the set value, the fuel supply control, the ignition timing control, the auxiliary air amount control, and the exhaust gas recirculation control are normally performed (step S12).

When the regeneration mode flag FSRCMODE is set to "1" in step S10, the program proceeds from step S11 to step S13, in which a temperature rise mode control for accelerating a temperature rise of the NOx removing device 15 is performed. In the temperature rise mode control, the fuel supply control is performed so that the air-fuel ratio becomes a stoichiometric ratio, and the ignition timing control is performed so that the ignition timing is retarded from an optimum ignition timing (step S13). Further, the auxiliary air amount control is performed so that the output torque of the engine 1 under the above fuel supply control and the above ignition timing control becomes substantially the same as the output torque under the normal control, and the exhaust gas recirculation control is performed so that the EGR valve 22 is closed to stop the exhaust gas recirculation (step S13). According to the temperature rise mode control, the temperature rise of the NOx removing device 15 can be accelerated with suppressed changes in the output torque of the engine 1.

Figure 9:
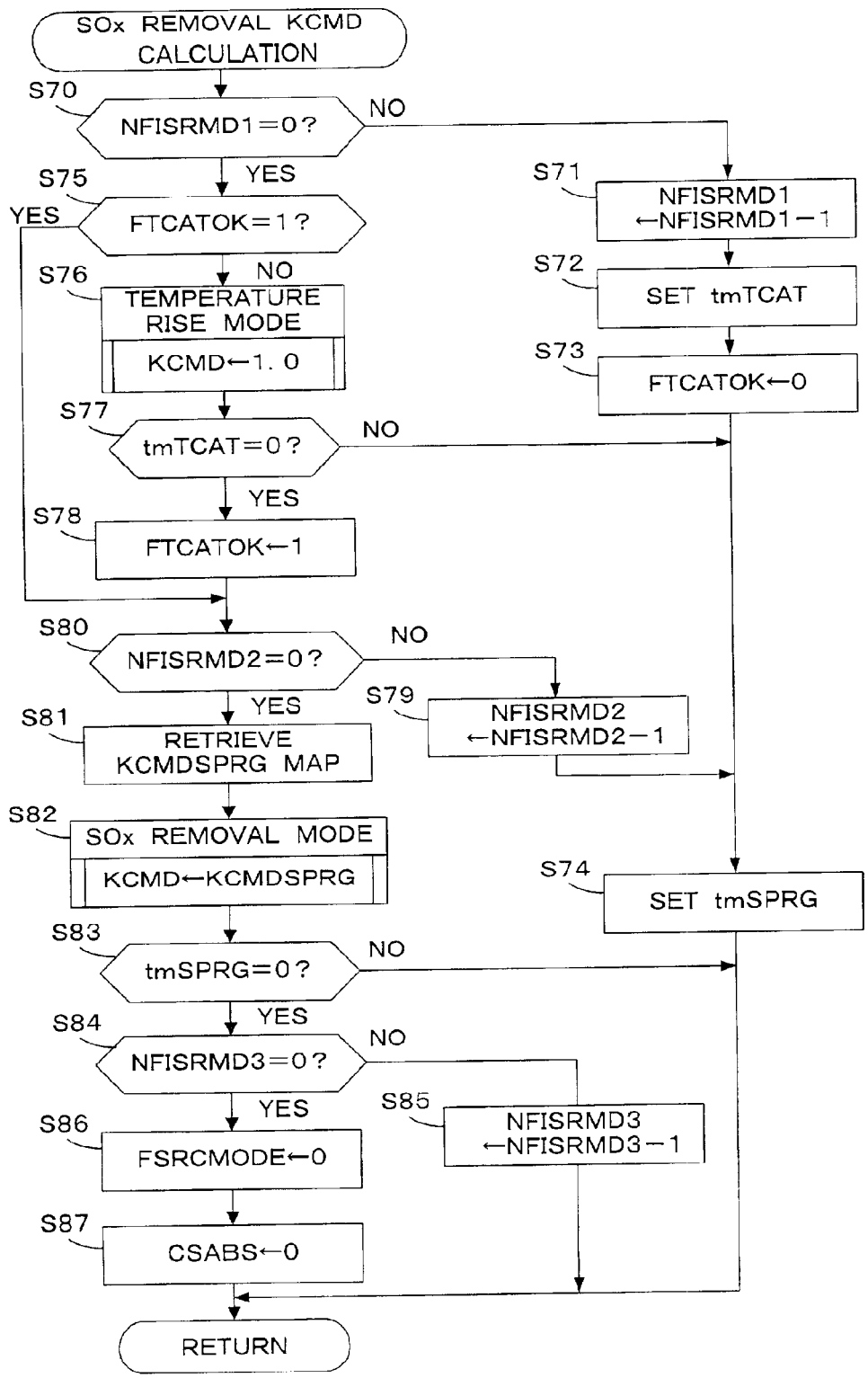
FIG. 9 is a flowchart showing a program for setting the target air-fuel ratio coefficient during the execution of regeneration process for the NOx removing device.

The processing of setting a target air-fuel ratio coefficient KCMD for the temperature rise mode control of step S13 is shown in FIG. 9. As will be hereinafter described with reference to FIG. 9, the control for maintaining the target air-fuel ratio coefficient KCMD at "1.0" is performed for a predetermined time period TMTCAT, and a temperature rise completion flag FTCATOK is set to "1" after the elapse of the predetermined time period TMTCAT, indicating the temperature rise is completed.

In step S14, it is determined whether or not the temperature rise completion flag FTCATOK is "1". If FTCATOK is "0", the program ends at once. If FTCATOK is "1", a SOx removal mode processing is executed (step S15). In this processing, the fuel supply control is performed so that the air-fuel ratio is set in a rich region with respect to the stoichiometric ratio, and the ignition timing control is performed so that the ignition timing is retarded from an optimum ignition timing. Further, the auxiliary air amount control is performed so that the output torque of the engine 1 under the above fuel supply control and the above ignition timing control becomes substantially the same as the output torque under the normal control, and the exhaust gas recirculation continues to be stopped. According to the SOx removal mode processing, SOx absorbed in the NOx removing device 15 can be reduced to be discharged with exhaust gases, thereby recovering the NOx absorbing capacity of the NOx removing device 15 with suppressed changes in the output torque of the engine 1.

FIG. 3 is a flowchart showing the SOx saturation determination processing to be executed in step S10 shown in FIG. 2.

Figure 4:
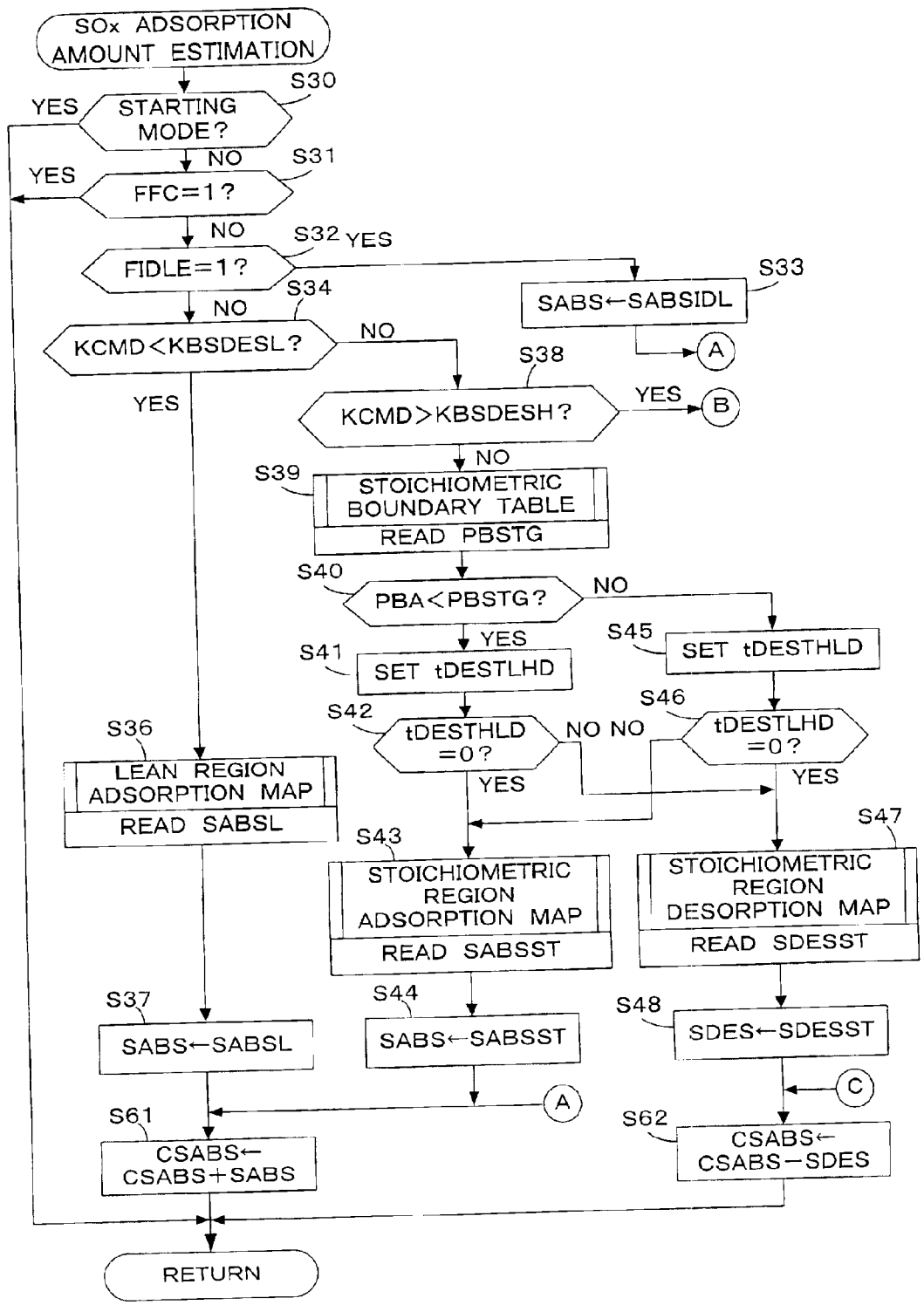
FIGS. 4 and 5 are flowcharts showing a program for the SOx adsorption amount estimation shown in FIG. 3.
Figure 5:
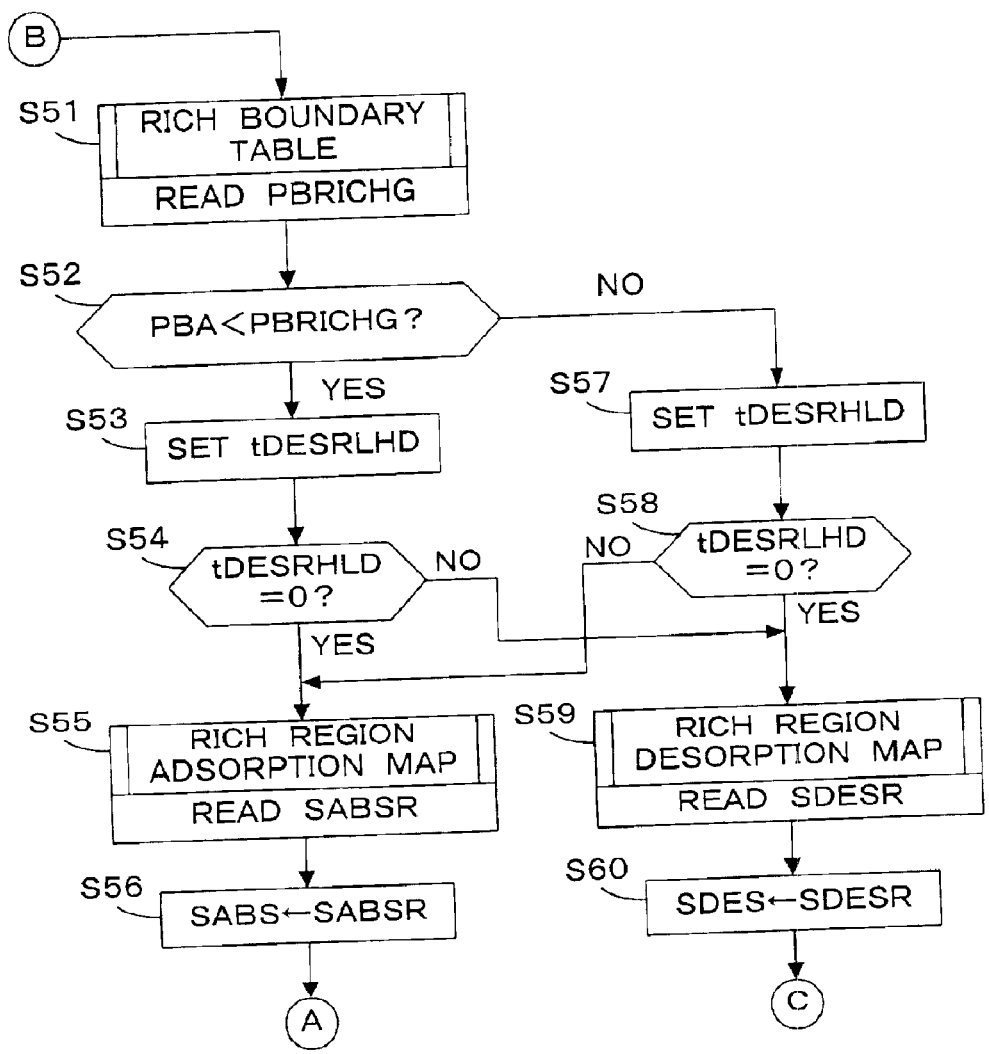

In step S20, a SOx adsorption amount estimation processing shown in FIGS. 4 and 5 is executed. In this processing, a SOx adsorption amount estimated value is calculated according to a set air-fuel ratio (target air-fuel ratio coefficient KCMD) and an operating condition of the engine 1. More specifically, the SOx adsorption amount estimated value is calculated by incrementing or decrementing a value of a SOx adsorption amount counter CSABS. The value of the SOx adsorption amount counter CSABS is stored in a backup memory (RAM) capable of holding memory contents even when turning off the ignition switch.

In step S21, it is determined whether or not the value of the counter CSABS is greater than or equal to a set value CSRMAC1. If CSABS is less than CSRMAC1, the program ends at once.

If CSABS becomes greater than or equal to CSRMAC1, the program proceeds from step S21 to step S22, in which it is determined whether or not the engine operating condition and the vehicle speed VP satisfy predetermined conditions. More specifically, it is determined whether or not the engine rotational speed NE is in the range from a predetermined lower limit NESRML (e.g., 1500 rpm) to a predetermined upper limit NESRMH (e.g., 3000 rpm), the absolute intake pressure PBA is in the range from a predetermined lower limit PBSRML (e.g., 61.3 kPa) to a predetermined upper limit PBSRMH (e.g., 81.3 kPa), the intake air temperature TA is in the range from a predetermined lower limit TASRML (e.g., 0 degrees Centigrade) to a predetermined upper limit TASRMH (e.g., 100 degrees Centigrade), the engine coolant temperature TW is in the range from a predetermined lower limit TWSRML (e.g., 80 degrees Centigrade) to a predetermined upper limit TWSRMH (e.g., 100 degrees Centigrade), and the vehicle speed VP is in the range from a predetermined lower limit VSRML (e.g., 60 km/h) to a predetermined upper limit VSRMH (e.g., 120 km/h). If all of these conditions are satisfied, the answer to step S22 becomes affirmative (YES) and the program proceeds to step S23, in which the regeneration mode flag FSRCMODE is set to "1". If at least one of the above conditions is not satisfied, the answer to step S22 becomes negative (NO) and the program proceeds to step S24, in which the regeneration mode flag FSRCMODE is set to "0".

FIGS. 4 and 5 are flowcharts showing the SOx adsorption amount estimation processing to be executed in step S20 shown in FIG. 3.

In step S30, it is determined whether or not the engine 1 is in a starting mode, i.e., during cranking. If the engine 1 is not in the starting mode, it is determined whether or not a fuel cut flag FFC is "1" (step S31). The flag FFC when set to "1" indicates that a fuel cut operation for interrupting the fuel supply to the engine 1 is being performed. If the engine 1 is in the starting mode or performing the fuel cut operation, the program ends at once.

If the engine 1 is not performing the fuel cut operation, it is determined whether or not an idle flag FIDLE "1" is "1" (step S32). The flag FIDLE when set to "1" indicates that the engine 1 is performing an idling operation. If FIDLE is "1", which indicates that the engine 1 is performing the idling operation, an addition value SABS is set to an idling addition value SABSIDL (step S33). Thereafter, the SOx adsorption amount counter CSABS is incremented by the addition value SABS (step S61), and this program ends.

Figure 6A:
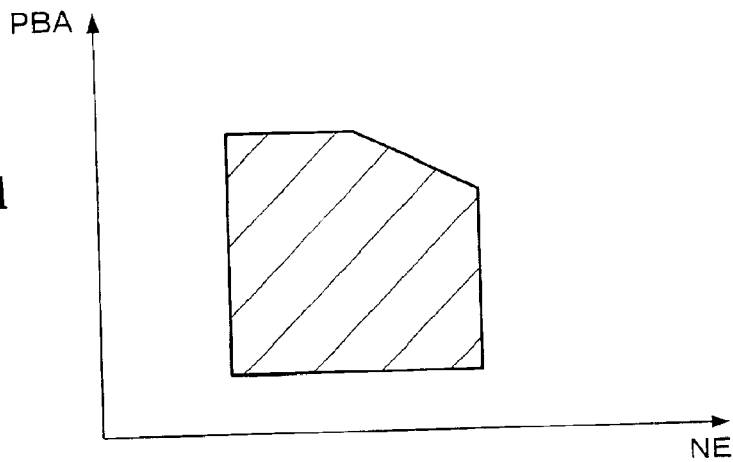
FIGS. 6A, 6B, and 6C are graphs showing maps used in the processing of FIGS. 4 and 5.

If FIDLE is "0", which indicates that the engine 1 is not performing the idling operation, it is determined whether or not the target air-fuel ratio coefficient KCMD is less than a lean determination threshold KBSDESL (e.g., 0.9) (step S34). If KCMD is less than KBSDESL, which indicates that the engine 1 is during a lean operation, a lean region adsorption map shown in FIG. 6A is retrieved according to the engine rotational speed NE and the absolute intake pressure PBA to calculate a lean operation value SABSL (step S36). The lean region adsorption map is set for a hatched region in FIG. 6A where the lean operation is executed. This map is set so that the value SABSL increases with an increase in the engine rotational speed NE and an increase in the absolute intake pressure PBA.

The addition value SABS is then set to the lean operation addition value SABSL calculated above (step S37), and the program proceeds to step S61.

Figure 7A:
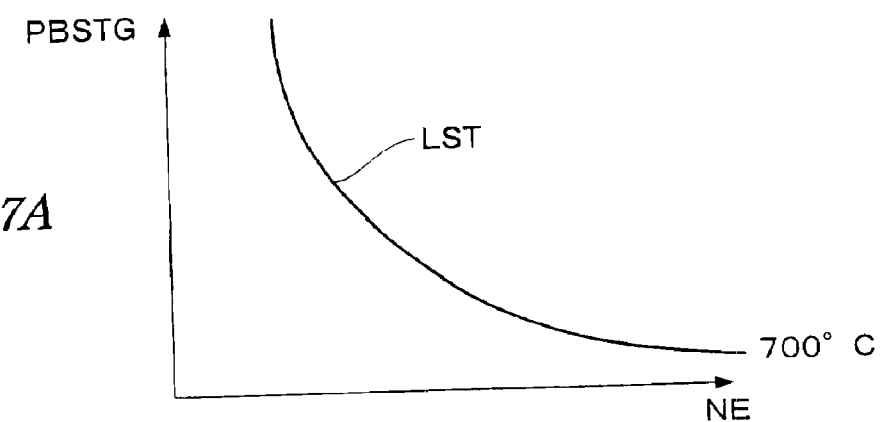
FIGS. 7A and 7B are graphs showing tables used in the processing of FIGS. 4 and 5.

If KCMD is greater than or equal to KBSDESL in step S34, it is further determined whether or not the target air-fuel ratio coefficient KCMD is greater than a rich determination threshold KBSDESH (e.g., 1.1) (step S38). If KCMD is less than or equal to KBSDESH, which indicates that the engine 1 is during a stoichiometric operation where the air-fuel ratio is set to the stoichiometric ratio, a stoichiometric boundary table shown in FIG. 7A is retrieved according to the engine rotational speed NE to calculate a stoichiometric boundary pressure PBSTG (step S39). The stoichiometric boundary table is set so that the engine rotational speed NE and the absolute intake pressure PBA that makes the temperature of the NOx removing device 15 become about 700 degrees Centigrade is obtained. When the absolute intake pressure PBA is higher than a line LST defined by the stoichiometric boundary table, the temperature of the NOx removing device 15 is higher than 700 degrees Centigrade, and SOx is desorbed from the NOx absorbent. Conversely, when the absolute intake pressure PBA is lower than the line LST, the temperature of the NOx removing device 15 is lower than 700 degrees Centigrade, and SOx is adsorbed to the NOx absorbent. Accordingly, in the following processing of steps S40 to S48, an addition value SABS for the SOx adsorption amount counter CSABS is calculated in the operating condition where SOx is adsorbed, while a subtraction value SDES for the SOx adsorption amount counter CSABS is calculated in the operating condition where SOx is desorbed.

Figure 6B:
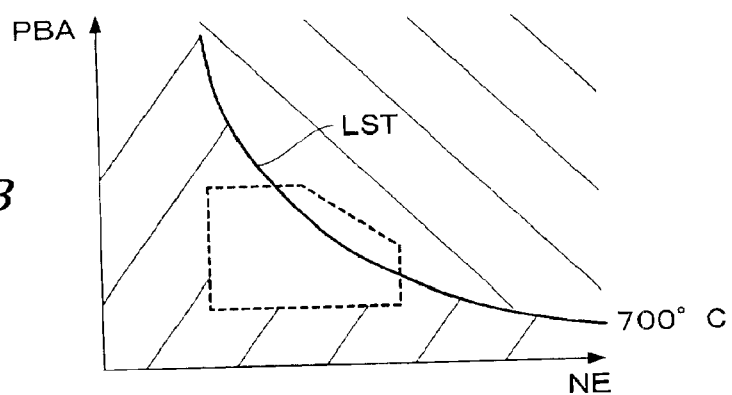

In step S40, it is determined whether or not the absolute intake pressure PBA is lower than the stoichiometric boundary pressure PBSTG. If PBA is lower than PBSTG, the downcount timer tDESTLHD in step S46 is set to a predetermined delay time TDESTLHD (e.g., 3 seconds) and started (step S41). Then, it is determined whether or not the value of a downcount timer tDESTHLD in step S45 is "0" (step S42). If tDESTHLD is greater than "0", the program proceeds to step S47. If tDESTHLD is equal to "0", the program proceeds to step S43, in which a stoichiometric region adsorption map shown in FIG. 6B is retrieved according to the engine rotational speed NE and the absolute intake pressure PBA to calculate a stoichiometric operation addition value SABSST. The stoichiometric region adsorption map is set for a region hatched by the lines inclined upward to the right in FIG. 6B where SOx is adsorbed to the NOx absorbent, and this map is set so that the addition value SABSST decreases with an increase in the engine rotational speed NE and an increase in the absolute intake pressure PBA. In FIG. 6B, a region surrounded by the broken line corresponds to the lean operation region shown in FIG. 6A.

Next, the addition value SABS is set to the stoichiometric operation addition value SABSST calculated above (step S44), and the program proceeds to step S61.

If PBA is higher than or equal to PBSTG in step S40, the downcount timer TDESTHLD is set to a predetermined delay time TDESTHLD (e.g., 3 seconds) and started (step S45). Then, it is determined whether or not the value of the downcount timer tDESTLHD started in step S41 is "0" (step S46). If tDESTLHD is greater than "0", the program proceeds to step S43. If tDESTLHD is equal to "0", the program proceeds to step S47, in which a stoichiometric region desorption map shown in FIG. 6B is retrieved according to the engine rotational speed NE and the absolute intake pressure PBA to calculate a stoichiometric operation subtraction value SDESST. The stoichiometric region desorption map is set for a region hatched by the lines inclined downward to the right in FIG. 6B where SOx is desorbed from the NOx absorbent, this map is set so that the subtraction value SDESST increases with an increase in the engine rotational speed NE and an increase in the absolute intake pressure PBA.

Next, the subtraction value SDES is set to the stoichiometric operation subtraction value SDESST calculated above (step S48), and the program proceeds to step S62, in which the value of the SOx adsorption amount counter CSABS is decremented by the subtraction value SDES. Then, this program ends.

Steps S41, S42, S45, and S46 are provided to delay the switching of control until the engine operating condition becomes stable when the engine operating condition changes from the adsorption region to the desorption region or vice versa.

Figure 7B:
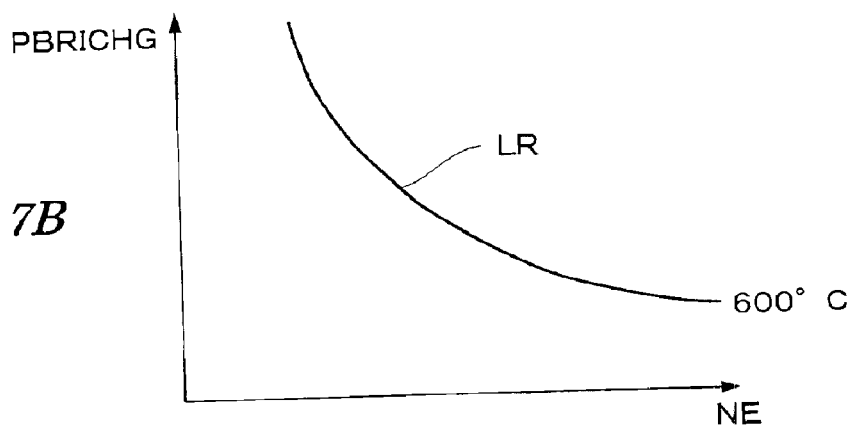

If KCMD is greater than KBSDESH in step S38, which indicates that the engine 1 is in a rich operation where the air-fuel ratio is set in a rich region with respect to the stoichiometric ratio, a rich boundary table shown in FIG. 7B is retrieved according to the engine rotational speed NE to calculate a rich boundary pressure PBRICHG (step S51 in FIG. 5). The rich boundary table is set so that the engine rotational speed NE and the absolute intake pressure PBA that makes the temperature of the NOx removing device 15 become about e.g., 600 degrees Centigrade is obtained. When the absolute intake pressure PBA is higher than a line LR defined by this table, the temperature of the NOx removing device 15 is higher than 600 degrees Centigrade, and SOx is desorbed from the NOx absorbent. Conversely, when the absolute intake pressure PBA is lower than the line LR, the temperature of the NOx removing device 15 is lower than 600 degrees Centigrade, and SOx is adsorbed to the NOx absorbent. Accordingly, in the following processing of steps S52 to S60, an addition value SABS for the SOx adsorption amount counter CSABS is calculated in the operating condition where SOx is adsorbed, while a subtraction value SDES for the SOx adsorption amount counter CSABS is calculated in the operating condition where SOx is desorbed.

Figure 6C:
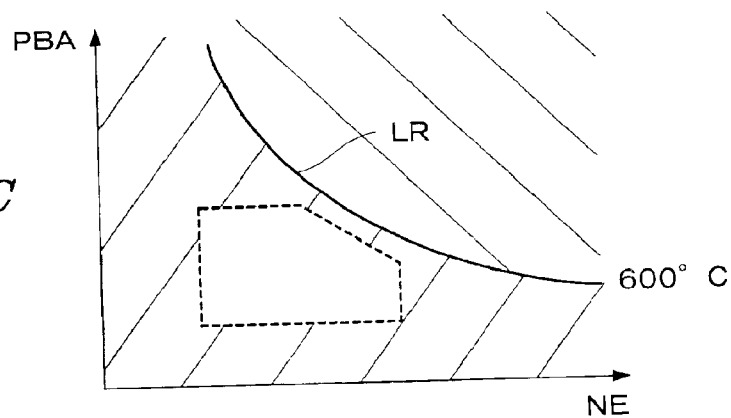

In step S52, it is determined whether or not the absolute intake pressure PBA is lower than the rich boundary pressure PBRICHG. If PBA is lower than PBRICHG, a downcount timer tDESRLHD in step S58 is set to a predetermined delay time TDESRLHD (e.g., 3 seconds) and started (step S53). Then, it is determined whether or not the value of a downcount timer tDESRHLD started in step S57 is "0" (step S54). If tDESRHLD is greater than "0", the program proceeds to step S59. If tDESRHLD equals "0", the program proceeds to step S55, in which a rich region adsorption map shown in FIG. 6C is retrieved according to the engine rotational speed NE and the absolute intake pressure PBA to calculate a rich operation addition value SABSR. The rich region adsorption map is set for a region hatched by the lines inclined upward to the right in FIG. 6C where SOx is adsorbed to the NOx absorbent, and this map is set so that the addition value SABSR decreases with an increase in the engine rotational speed NE and an increase in the absolute intake pressure PBA. In FIG. 6C, a region surrounded by the broken line corresponds to the lean operation region shown in FIG. 6A.

Next, the addition value SABS is set to the rich operation addition value SABSR calculated above (step S56), and the program proceeds to step S61.

If PBA is higher than or equal to PBRICHG in step S52, the downcount timer tDESRHLD is set to a predetermined delay time TDESRHLD (e.g., 3 seconds) and started (step S57). Then, it is determined whether or not the value of the downcount timer tDESRLHD started in step S53 is "0" (step S58). If tDESRLHD is greater than "0", the program proceeds to step S55. If TDESRLHD equals "0", the program proceeds to step S59, in which a rich region desorption map shown in FIG. 6C is retrieved according to the engine rotational speed NE and the absolute intake pressure PBA to calculate a rich operation subtraction value SDESR. The rich region desorption map is set for a region hatched by the lines inclined downward to the right in FIG. 6C, where SOx is desorbed from the NOx absorbent, and this map is set so that the subtraction value SDESR increases with an increase in the engine rotational speed NE and an increase in the absolute intake pressure PBA.

Next, the subtraction value SDES is set to the rich operation subtraction value SDESR calculated above (step S60), and the program proceeds to step S62, in which the value of the SOx adsorption amount counter CSABS is decremented by the subtraction value SDES. Then, this program ends.

According to the processing of FIGS. 4 and 5, the addition value SABS corresponding to a SOx adsorption amount per unit time and the subtraction value SDES corresponding to a SOx desorption amount per unit time are calculated according to the set air-fuel ratio and the engine operating condition, and the value of the SOx adsorption amount counter CSABS is incremented by the addition value SABS or decremented by the subtraction value SDES. That is, an estimated value of the amount of SOx adsorbed to the NOx absorbent is calculated by accumulating the addition value SABS or the subtraction value SDES set according to the air-fuel ratio and the engine operating condition. As a result, the amount of SOx adsorbed to the NOx absorbent in the NOx removing device 15 can be accurately estimated, and the SOx removal processing can therefore be executed at an optimum timing.

Figure 8:
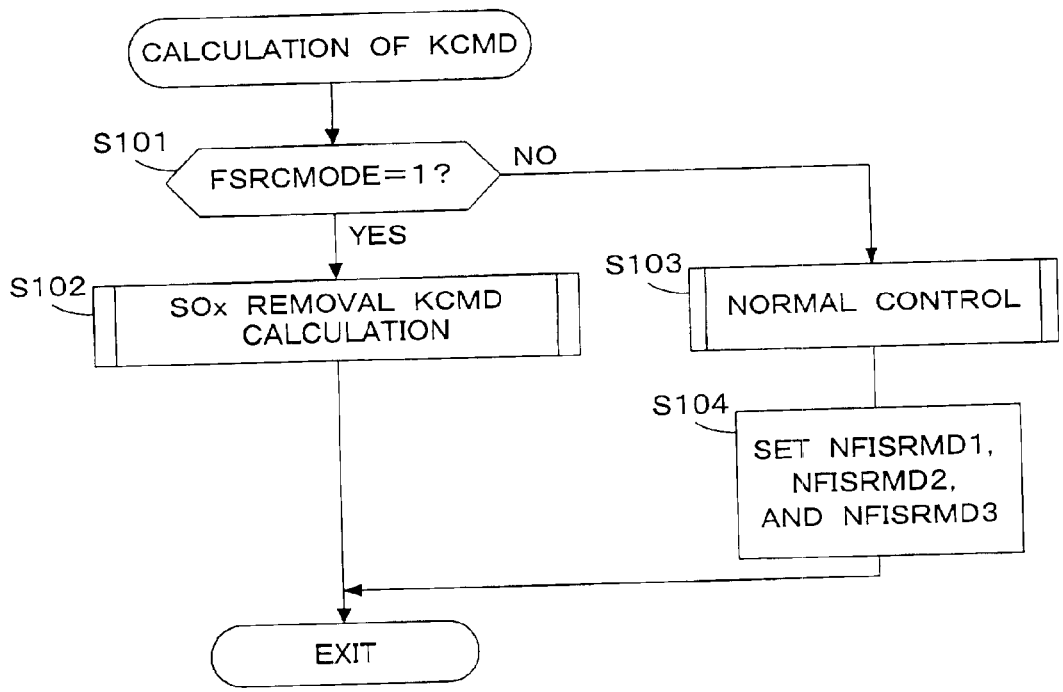
FIG. 8 is a flowchart showing a program for calculating a target air-fuel ratio coefficient (KCMD)

FIG. 8 is a flowchart showing a program for calculating the target air-fuel ratio coefficient KCMD. This program is executed by CPU 5b in synchronism with the generation of a TDC signal pulse.

In step S101, it is determined whether or not the regeneration mode flag FSRCMODE is "1". If FSRCMODE is "0", normal control is performed, that is, the target air-fuel ratio coefficient KCMD is set according to the engine operating condition (step S103). Basically, the target air-fuel ratio coefficient KCMD is calculated according to the engine rotational speed NE and the absolute intake pressure PBA, and changed to a value corresponding to a low-temperature condition of the engine coolant temperature TW or a predetermined high-load operating condition. Next, counters NFISRMD1, NFISRMD2, and NFISRMD3 in the processing of FIG. 9 are set to predetermined values N1, N2, and N3, respectively (step S104), and this program ends.

If FSRCMODE is "1" in step S101, which indicates that the regeneration process for the NOx removing device 15 is executed, a SOx removal KCMD calculation process shown in FIG. 9 is executed (step S102).

In step S70 shown in FIG. 9, it is determined whether or not the value of the counter NFISRMD1 is "0". Since NFISRMD1 is greater than "0" initially, the value of the counter NFISRMD1 is decremented by "1" (step S71). Thereafter a downcount timer tmTCAT is set to an execution period TMTCAT (e.g., 60 seconds) for the temperature rise mode and started (step S72). Next, a temperature rise completion flag FTCATOK is set to "0" (step S73). The flag FTCATOK when set to "1" indicates that the temperature rise mode is completed. In step S74, a downcount timer tmSPRG is set to an execution period TMSPRG (e.g., 30 seconds) for the SOx removal mode and started (step S74). Then, the program ends.

If the value of the counter NFISRMD1 equals "0", the program proceeds from step S70 to step S75, in which the temperature rise completion flag FTCATOK is "1". Since FTCATOK is "0" initially, the target air-fuel ratio coefficient KCMD is set to a value for the temperature rise mode, i.e., "1.0" corresponding to the stoichiometric ratio (step S76). Then, it is determined whether or not the value of the timer tmTCAT is "0" (step S77). If tmTCAT is greater than "0", the program proceeds to step S74. If tmTCAT equals "0", the temperature rise completion flag FTCATOK is set to "1" (step S78). After the temperature rise completion flag FTCATOK is set to "1", the program proceeds from step S75 directly to step S80 in the subsequent cycles.

In step S80, it is determined whether or not the value of the counter NFISRMD2 is "0". Since NFISRMD2 is greater than "0" initially, the value of the counter NFISRMD2 is decremented by "1" (step S79), and the program proceeds to step S74. If NFISRMD2 equals "0", the program proceeds from step S80 to step S81, in which a KCMDSPRG map is retrieved according to the engine rotational speed NE and the absolute intake pressure PBA to calculate an enrichment set value KCMDSPRG for the SOx removal mode. The KCMDSPRG map is set so that the enrichment set value KCMDSPRG increases with an increase in the engine rotational speed NE and an increase in the absolute intake pressure PBA. Alternatively, the enrichment set value KCMDSPRG for the SOx removal mode may be set to a fixed value (e.g., a value corresponding to an air-fuel ratio of 12.5).

In step S82, the target air-fuel ratio coefficient KCMD is set to the enrichment set value KCMDSPRG calculated above. Then, it is determined whether or not the value of the timer tmSPRG is "0" (step S83). If tmSPRG is greater than "0", the program ends at once. If tmSPRG equals "0", it is determined whether or not the value of the counter NFIS-RMD3 is "0" (step S84). Since NFISRMD3 is greater than "0" initially, the value of the counter NFISRMD3 is decremented by "1" (step S85), and the program ends. If NFIS-RMD3 equals "0", the regeneration mode flag FSRCMODE is returned to "0" (step S86), and the value of the SOx adsorption amount counter CSABS is returned to "0" (step S87). Thereafter, this program ends.

According to the process of FIG. 9, the target air-fuel ratio coefficient KCMD is first set to "1.0" in the temperature rise mode for the NOx removing device 15, and next set to the enrichment set value KCMDSPRG in the SOx removal mode after completion of the temperature rise mode. As a result, the temperature rise of the NOx removing device 15 can be accelerated to reduce and discharge SOx absorbed to the NOx absorbent, thereby regenerating the sulfur-poisoned NOx removing device 15.

In this preferred embodiment, the ECU 5 constitutes the sulfur oxide amount estimating module and the sulfur oxide removing module. More specifically, the processing of FIGS. 4 and 5 corresponds to the sulfur oxide amount estimating module, and the steps S13 and S15 in FIG. 2 correspond to the sulfur oxide removing module.

The present invention is not limited to the above preferred embodiment, but various modifications may be made. For example, in the above preferred embodiment, the amount of SOx absorbed to the NOx removing device 15 is estimated and the SOx removal process is executed at the time the estimated SOx amount has reached a set value. The present invention may be applied to the estimation of the amount of SOx absorbed to a SOx removing device provided upstream of a NOx removing device as shown in Japanese Patent Laid-open No. 11-247650.

Further, in the above preferred embodiment, the addition value SABS or the subtraction value SDES is calculated according to the target air-fuel ratio coefficient KCMD, the engine rotational speed NE, and the absolute intake pressure PBA. The target air-fuel ratio coefficient KCMD may be replaced with the detected equivalent ratio KACT calculated from a detected value from the LAF sensor 14.

What is claimed is:

1. An exhaust emission control system for an internal combustion engine, having an exhaust system comprising:
a nitrogen oxide removing means provided in the exhaust system of said engine for absorbing nitrogen oxide contained in exhaust gases in an exhaust lean condition;
a sulfur oxide amount estimating means for estimating the amount of sulfur oxide absorbed in said nitrogen oxide removing means; and
a sulfur oxide removing means for removing the sulfur oxide when the sulfur oxide amount estimated by said sulfur oxide amount estimating means has reached a set value;

wherein said sulfur oxide amount estimating means estimates an amount of change per unit time in the sulfur oxide amount according to an air-fuel ratio of an air-fuel mixture supplied to said engine and an operating condition of said engine, and accumulates the estimated amount of change to thereby estimate the sulfur oxide amount, wherein said sulfur oxide amount estimating means includes a first estimating means for estimating the amount of change in the sulfur oxide amount according to the operating condition of said engine when the air-fuel ratio is set in the vicinity of a stoichiometric ratio, a second estimating means for estimating the amount of change in the sulfur oxide amount according to the operating condition of said engine when the air-fuel ratio is set in a lean region with respect to the stoichiometric ratio, and a third estimating means for estimating the amount of change in the sulfur oxide amount according to the operating condition of said engine when the air-fuel ratio is set in a rich region with respect to the stoichiometric ratio.

2. The exhaust emission control system according to claim 1, wherein:
said first estimating means outputs a first negative amount of change in the sulfur oxide amount in the engine operating condition where the temperature of said nitrogen oxide removing means is higher than or equal to a first predetermined temperature, and outputs a first positive amount of change in the sulfur oxide amount in the engine operating condition where the temperature of said nitrogen oxide removing means is lower than the first predetermined temperature;
said second estimating means outputs a second positive amount of change in the sulfur oxide amount according to the operating condition of said engine; and
said third estimating means outputs a second negative amount of change in the sulfur oxide amount in the engine operating condition where the temperature of said nitrogen oxide removing means is higher than or equal to a second predetermined temperature which is lower than the first predetermined temperature, and outputs a third positive amount of change in the sulfur oxide amount in the engine operating condition where the temperature of said nitrogen oxide removing means is lower than the second predetermined temperature.

3. The exhaust emission control system according to claim 2, wherein:
said first estimating means calculates the first negative amount of change so that the absolute value of the first negative amount of change increases with an increase in a rotational speed and/or an intake pressure of said engine, and calculates the first positive amount of change so that the first positive amount of change decreases with an increase in the rotational speed and/or the intake pressure of said engine;
said second estimating means calculates the second positive amount of change so that the second positive amount of change increases with an increase in the rotational speed and/or the intake pressure of said engine; and
said third estimating means calculates the second negative amount of change so that the absolute value of the second negative amount of change increases with an increase in the rotational speed and/or the intake pressure of said engine, and calculates the third positive amount of change so that the third positive amount of change decreases with an increase in the rotational speed and/or the intake pressure of said engine.

4. The exhaust emission control system according to claim 1, wherein said sulfur oxide removing means sets the air-fuel ratio in the vicinity of the stoichiometric ratio over a predetermined time period and subsequently sets the air-fuel ratio to a rich air-fuel ratio with respect to the stoichiometric ratio when removing the sulfur oxide.

5. The exhaust emission control system according to claim 1, wherein said sulfur oxide removing means retards the ignition timing of said engine from a normal set value, stops the exhaust gas recirculation, and controls the amount of intake air supplied to said engine so that the output torque of said engine does not change when removing the sulfur oxide.

6. An exhaust emission control system for an internal combustion engine, having an exhaust system comprising:
   a nitrogen oxide removing device provided in the exhaust system of said engine for absorbing nitrogen oxide contained in exhaust gases in an exhaust lean condition;
   a sulfur oxide amount estimating module for estimating the amount of sulfur oxide absorbed in said nitrogen oxide removing device; and
   a sulfur oxide removing module for removing the sulfur oxide when the sulfur oxide amount estimated by said sulfur oxide amount estimating module has reached a set value;
   wherein said sulfur oxide amount estimating module estimates an amount of change per unit time in the sulfur oxide amount according to an air-fuel ratio of an air-fuel mixture supplied to said engine and an operating condition of said engine, and accumulates the estimated amount of change to thereby estimate the sulfur oxide amount,
   wherein said sulfur oxide amount estimating module includes a first estimating module for estimating the amount of change in the sulfur oxide amount according to the operating condition of said engine when the air-fuel ratio is set in the vicinity of a stoichiometric ratio, a second estimating module for estimating the amount of change in the sulfur oxide amount according to the operating condition of said engine when the air-fuel ratio is set in a lean region with respect to the stoichiometric ratio, and a third estimating module for estimating the amount of change in the sulfur oxide amount according to the operating condition of said engine when the air-fuel ratio is set in a rich region with respect to the stoichiometric ratio.

7. The exhaust emission control system according to claim 6, wherein:
   said first estimating module outputs a first negative amount of change in the sulfur oxide amount in the engine operating condition where the temperature of said nitrogen oxide removing device is higher than or equal to a first predetermined temperature, and outputs a first positive amount of change in the sulfur oxide amount in the engine operating condition where the temperature of said nitrogen oxide removing device is lower than the first predetermined temperature;
   said second estimating module outputs a second positive amount of change in the sulfur oxide amount according to the operating condition of said engine; and
   said third estimating module outputs a second negative amount of change in the sulfur oxide amount in the engine operating condition where the temperature of said nitrogen oxide removing device is higher than or equal to a second predetermined temperature which is lower than the first predetermined temperature, and outputs a third positive amount of change in the sulfur oxide amount in the engine operating condition where the temperature of said nitrogen oxide removing device is lower than the second predetermined temperature.

8. The exhaust emission control system according to claim 7, wherein:
   said first estimating module calculates the first negative amount of change so that the absolute value of the first negative amount of change increases with an increase in a rotational speed and/or an intake pressure of said engine, and calculates the first positive amount of change so that the first positive amount of change decreases with an increase in the rotational speed and/or the intake pressure of said engine;
   said second estimating module calculates the second positive amount of change so that the second positive amount of change increases with an increase in the rotational speed and/or the intake pressure of said engine; and
   said third estimating module calculates the second negative amount of change so that the absolute value of the second negative amount of change increases with an increase in the rotational speed and/or the intake pressure of said engine, and calculates the third positive amount of change so that the third positive amount of change decreases with an increase in the rotational speed and/or the intake pressure of said engine.

9. The exhaust emission control system according to claim 6, wherein said sulfur oxide removing module sets the air-fuel ratio in the vicinity of the stoichiometric ratio over a predetermined time period and subsequently sets the air-fuel ratio to a rich air-fuel ratio with respect to the stoichiometric ratio when removing the sulfur oxide.

10. The exhaust emission control system according to claim 6, wherein said sulfur oxide removing module retards the ignition timing of said engine from a normal set value, stops the exhaust gas recirculation, and controls the amount of intake air supplied to said engine so that the output torque of said engine does not change when removing the sulfur oxide.

11. A computer program for causing a computer to carry out a method for removing sulfur oxide absorbed in a nitrogen oxide removing means provided in an exhaust system of an internal combustion engine for absorbing nitrogen oxide contained in exhaust gases in an exhaust lean condition, said method comprising the steps of:
   a) estimating an amount of change per unit time in sulfur oxide absorbed in said nitrogen oxide removing means according to the air-fuel ratio of an air-fuel mixture supplied to said engine and an operating condition of said engine, comprising the steps of:
     i) estimating the amount of change in the sulfur oxide amount according to the operating condition of said engine when the air-fuel ratio is set in the vicinity of the stoichiometric ratio,
     ii) estimating the amount of change in the sulfur oxide amount according to the operating condition of said engine when the air-fuel ratio is set in a lean region with respect to the stoichiometric ratio, and
     iii) estimating the amount of change in the sulfur oxide amount according to the operating condition of said engine when the air-fuel ratio is set in a rich region with respect to the stoichiometric ratio;
   b) accumulating the estimated amount of change to thereby estimate an amount of sulfur oxide absorbed in said nitrogen oxide removing means; and c) removing the sulfur oxide when the estimated sulfur oxide amount has reached a set value.

12. The computer program according to claim 11, wherein:

the step i) of estimating the amount of change in the sulfur oxide amount comprises the steps of calculating a first negative amount of change in the sulfur oxide amount in the engine operating condition where the temperature of said nitrogen oxide removing means is higher than or equal to a first predetermined temperature, and calculating a first positive amount of change in the sulfur oxide amount in the engine operating condition where the temperature of said nitrogen oxide removing means is lower than the first predetermined temperature;

the step ii) of estimating the amount of change in the sulfur oxide amount comprises the step of calculating a second positive amount of change in the sulfur oxide amount according to the operating condition of said engine; and the step iii) of estimating the amount of change in the sulfur oxide amount comprises the steps of calculating a second negative amount of change in the sulfur oxide amount in an engine operating condition where the temperature of said nitrogen oxide removing device is higher than or equal to a second predetermined temperature which is lower than the first predetermined temperature, and calculating a third positive amount of change in the sulfur oxide amount in an engine operating condition where the temperature of said nitrogen oxide removing device is lower than the second predetermined temperature.

13. The computer program according to claim 12, wherein:

the first negative amount of change is calculated so that the absolute value of the first negative amount of change increases with an increase in a rotational speed and/or an intake pressure of said engine;

the first positive amount of change is calculated so that the first positive amount of change decreases with an increase in the rotational speed and/or the intake pressure of said engine;

the second positive amount of change is calculated so that the second positive amount of change increases with an increase in the rotational speed and/or the intake pressure of said engine;

the second negative amount of change is calculated so that the absolute value of the second negative amount of change increases with an increase in the rotational speed and/or the intake pressure of said engine; and the third positive amount of change is calculated so that the third positive amount of change decreases with an increase in the rotational speed and/or the intake pressure of said engine.

14. The computer program according to claim 11, wherein the step c) of removing sulfur oxide comprises the steps of setting the air-fuel ratio in the vicinity of the stoichiometric ratio over a predetermined time period, and subsequently setting the air-fuel ratio to a rich air-furl ratio with respect to the stoichiometric ratio.

15. The computer program according to claim 11, wherein the step c) of removing sulfur oxide comprises the steps of retarding the ignition timing of said engine from a normal set value, stopping the exhaust gas recirculation, and controlling the amount of intake air supplied to said engine so that the output torque of said engine does not change.

* * * * *